United States Patent [19]

Filan et al.

[11] 4,150,723
[45] Apr. 24, 1979

[54] ROLLOVER APPARATUS FOR PLOWS

[76] Inventors: Alton N. Filan; A. LaVerne Filan, both of Rte. 1, Box 69, Waitsburg, Wash. 99361

[21] Appl. No.: 792,791

[22] Filed: May 2, 1977

[51] Int. Cl.² ............................................. A01B 3/44
[52] U.S. Cl. ................................................. 172/225
[58] Field of Search ...................... 172/224, 225, 447; 298/10, 35 M

[56] References Cited

U.S. PATENT DOCUMENTS

| | | | |
|---|---|---|---|
| 2,882,979 | 4/1959 | Chandler | 172/225 |
| 3,196,955 | 7/1965 | Ogle | 172/225 |
| 3,749,178 | 7/1973 | Watts | 172/225 |
| 4,061,194 | 12/1977 | McCanse | 172/447 |

FOREIGN PATENT DOCUMENTS 1028495  5/1966  United Kingdom .................... 172/225

*Primary Examiner*—Richard J. Johnson
*Attorney, Agent, or Firm*—Wells, St. John & Roberts

[57] ABSTRACT

A rollover mechanism for pivoting the plow frame of a two-way gang plow between alternate operative field positions angularly spaced 180 degrees apart relative to a center axis on a supporting three point hitch framework. The plow frame is further positionable in an upright attitude for travel purposes. Movement of the plow frame relative to a supporting wheeled carrier or three point hitch framework is accomplished through a crank arm connected to a plow frame pivot shaft. An elongated lever arm is pivotally connected both to the crank arm and to an extendable hydraulic cylinder assembly mounted to the supporting three point hitch framework. An intermediate link is pivotally connected to the three point hitch framework and is also pivotally connected to the elongated lever arm. Straight line movement of the hydraulic cylinder assembly is thereby converted to angular movement of the pivot shaft. Both the elongated lever arm and the intermediate link have side edges arcuately curved in a concave configuration facing toward the center axis of the pivot shaft. This configuration allows them to be wrapped very closely about the pivot shaft to accomplish full 180° movement of the pivot shaft, as well as the plow frame and plows supported by it.

1 Claim, 4 Drawing Figures

ROLLOVER APPARATUS FOR PLOWS

BACKGROUND OF THE INVENTION

This invention relates to a mechanical operator for a two-way gang plow. Such plows include a plow frame supporting a plurality of double-ended plows for use when plowing a field in opposed directions from one end to the other. Two-way plows require a mechanism to swing the plow frame from one side to the other, as well as the further ability to move the plow frame to an upright position for travel purposes.

Various arrangements have been previously proposed for accomplishing such movement. In U.S. Pat. No. 3,749,178 to Watts, a pair of cylinders acting in tandem is used to assure full 180° movement. In U.S. Pat. No. 2,882,979 to Chandler, the movement of a transverse cylinder is converted to rotational movement through a pair of intermeshing segmented gears. U.S. Pat. No. 2,943,689 shows power being supplied for direct rotation of a pivot shaft through a rotatable driving sprocket and a connecting chain. However, as such plows become larger and heavier, transmission of direct rotational power becomes much more difficult and expensive.

U.S. Pat. No. 3,196,955 discloses a prior mechanical apparatus for converting the movement of a single cylinder to the required angular movement of the plow frame for a two-way gang plow. However, the torque applied to the pivot shaft during such movement is not constant. It varies with the separation of the pivotal axes in a lost-motion connection between an operational lever and a crank arm mounted to the pivot shaft for the plow frame. The apparatus includes several interconnected linkages for applying straight line movement from the cylinder assembly, and further incorporates the mechanical disadvantages of a lost-motion connection, which requires sliding bearings in addition to the rotational bearings needed for angular movement.

SUMMARY OF THE INVENTION

The apparatus disclosed in this application essentially relates to a rollover apparatus for a two-way plow having a supporting mobile framework and a plow frame that is pivotally mounted to it about the center axis of a pivot shaft. A rigid crank arm is operatively fixed to the plow frame. An elongated lever arm is pivotally connected at one end to the crank arm. An intermediate rigid link is pivotally connected at one end to the mobile framework and at its remaining end to the elongated lever arm. A power cylinder is operatively connected between the mobile framework and the elongated lever arm to impart movement to the lever arm and thereby swing the crank arm about the center axis through an angular distance of at least 180°. Movement of the elongated lever arm is controlled by its interconnection to the mobile framework through the intermediate rigid link.

It is a first object of this invention to provide a relatively simple mechanical interconnection between a single cylinder assembly and the pivot shaft for a two-way plow to convert straight line movement of the cylinder assembly to pivotal movement.

Another object of this invention is to assure full 180° angular movement of the two-way plow without the inclusion of a lost-motion connection or other more complicated mechanical connection.

Another object of this invention is to provide a mechanical pivot assembly for a two-way plow which can be designed to move and control modern large plow arrangements presenting substantial weight loads.

Another object is to provide an arrangement which provides constant torque to the pivot shaft for the plow frame throughout its full range of angular movement.

These and further objects will be evident from the following disclosure and the accompanying drawings, which illustrate a preferred embodiment of the invention.

DESCRIPTION OF THE PREFERRED EMBODIMENT

This disclosure relates to two-way plows. Such plows generally comprise a plurality of double-ended plows arranged along a diagonal beam or plow frame which can be turned 180° about a longitudinal horizontal axis on a supporting mobile framework. The mobile framework might be a wheel-supported tool carrier or a three point hitch framework, both having been used in such applications. In this manner, right hand and left hand plows are carried on a single plow frame for alternate use when plowing a field in opposed directions. The field can therefore be plowed back and forth while shifting the soil in a common direction toward one side of the field.

Such plows are well-known and further details concerning them are not believed necessary to an understanding of this disclosure. As an example of a patent more fully describing the plow structure and its operation, reference is made to U.S. Pat. No. 3,749,178 to Watts, which is hereby incorporated by reference.

Figure 1:
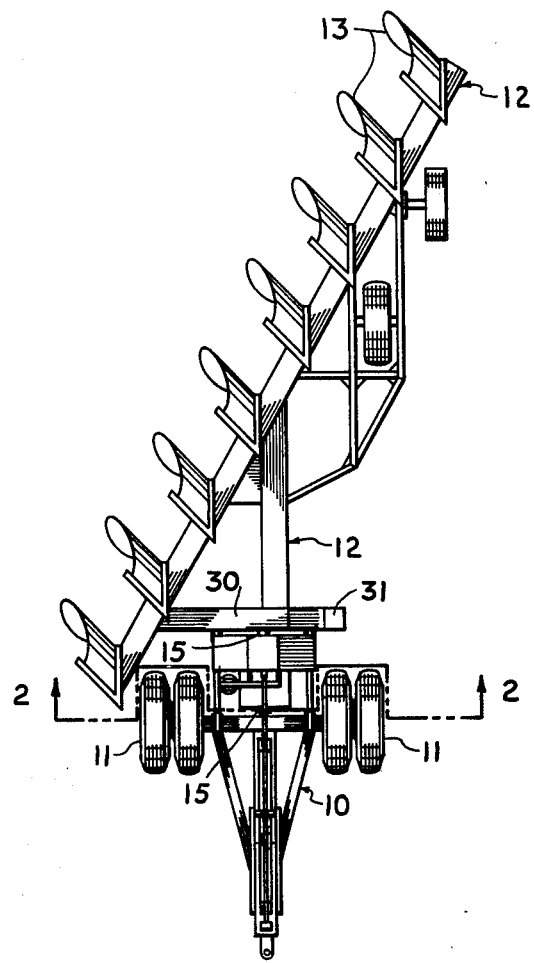
FIG. 1 is a simplified plan view of a two-way plow incorporating the present invention.

FIG. 1 illustrates the basic two-way plow assembly. It includes a wheeled mobile carrier or three point hitch framework 10 adapted for movement along a field while plowing, or along a road when traveling from one field location to another. The illustrated carrier is supported by wheels 11. A plow frame 12 is a diagonal beam which supports a plurality of double-ended plows 13.

The plow frame 12 is fixed to a pivot shaft 14 movably journalled to the three point hitch framework 10 by bearings 15. The pivot shaft 14 carries the plow frame 12 for angular movement about its center axis, which is arranged in a longitudinal direction parallel to the intended direction of movement of the two-way plow in the field. The plow frame 12 is pivotable from one side of framework 10 to the other, necessitating pivotal movement of plow frame 12 an angular distance of 180° about the center axis of pivot shaft 14. In addition, it is desirable that plow frame 12 be movable to an upright or vertical position for transport purposes when being moved from one field location to another.

Figure 2:
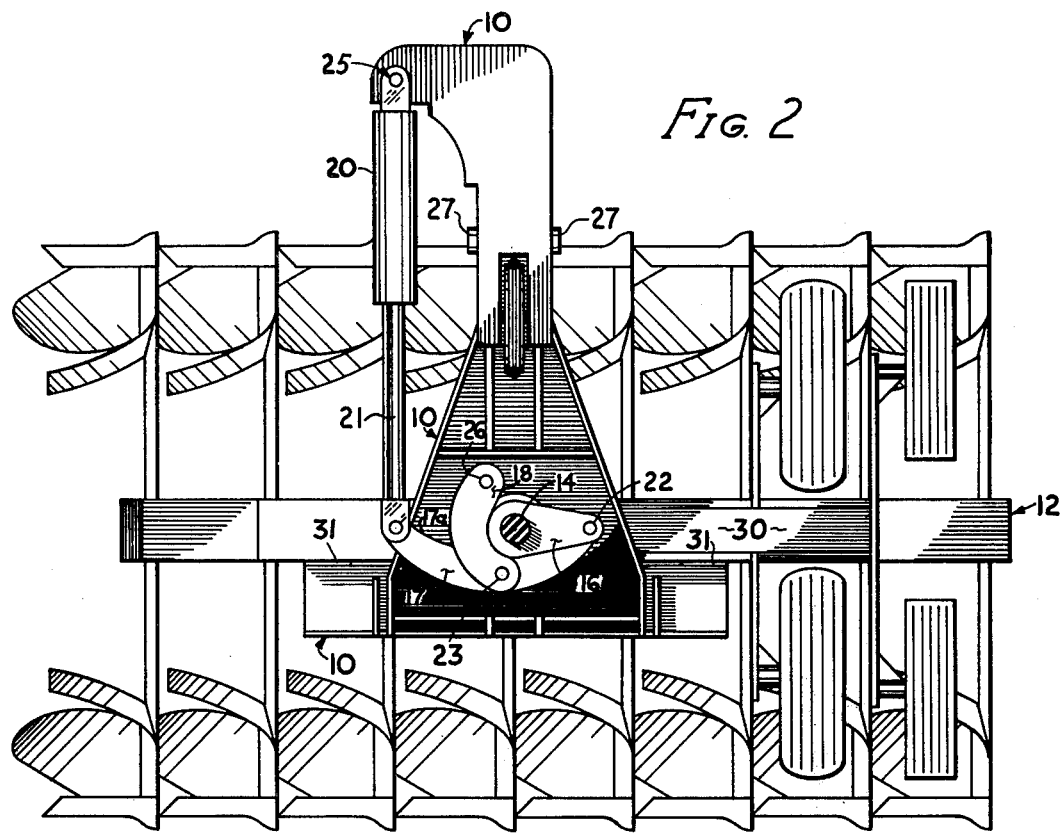
FIG. 2 is an enlarged elevation view of the rollover apparatus as seen along line 2—2 in FIG. 1.
Figure 3:
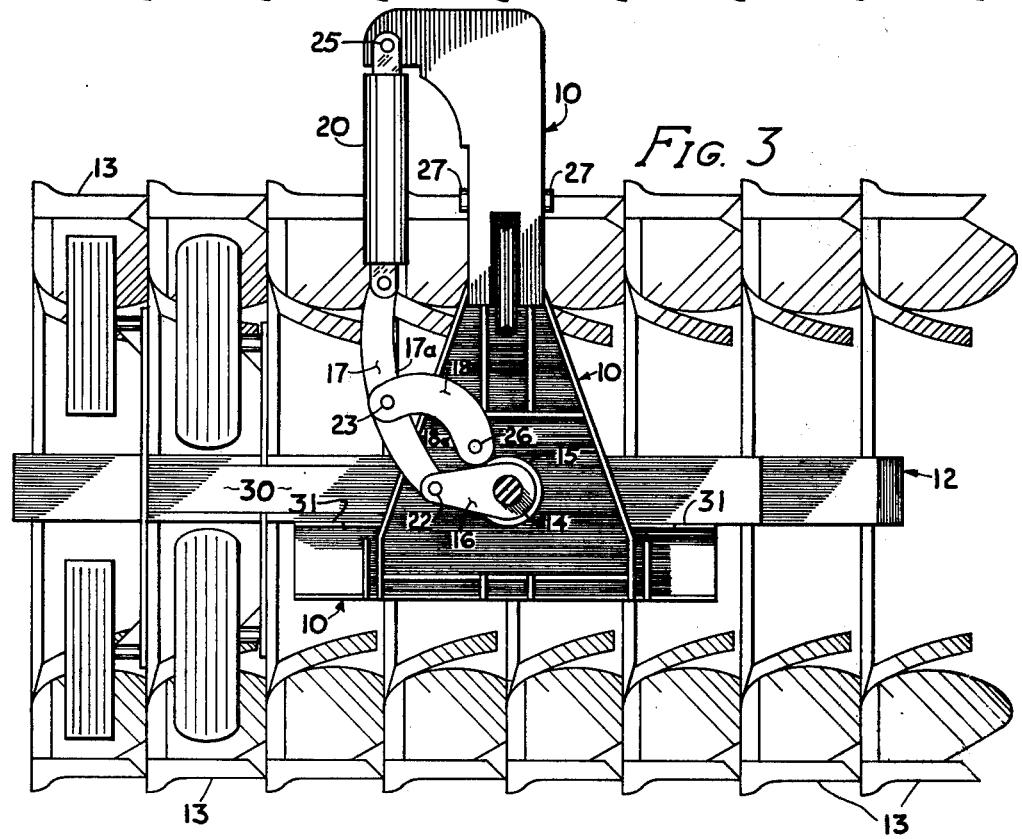
FIG. 3 is a view similar to FIG. 2 showing the assembly in its opposite angular position.
Figure 4:
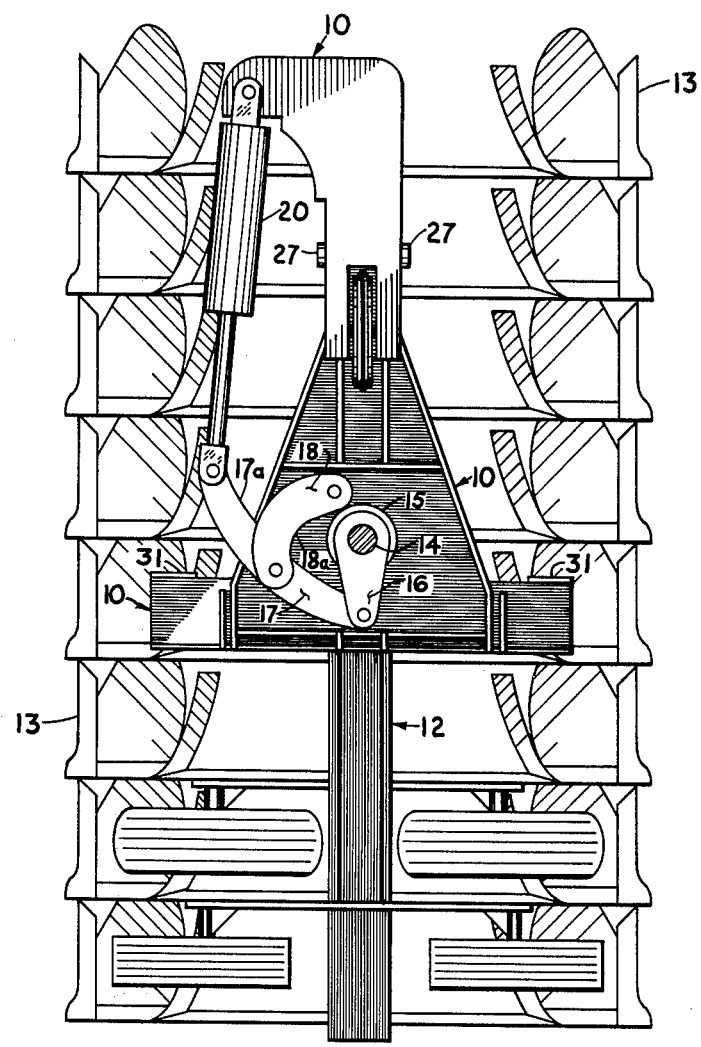
FIG. 4 is a view similar to FIG. 2 showing an intermediate position of the assembly.

FIGS. 2 through 4 illustrate the present rollover apparatus applied to the general arrangement of the two-way plow shown in FIG. 1. FIG. 2 shows the apparatus at one extreme angular position for plowing of a field in a first direction. FIG. 3 shows the same apparatus at its opposite extreme position for plowing a field in the opposite direction of movement. FIG. 4 shows an intermediate position wherein the plow frame 12 would be in a vertical position for travel purposes.

As can be seen in FIGS. 2 through 4, a rigid radial crank arm 16 is located forward of three point hitch framework 10 and is fixed to the front end of pivot shaft 14 for joint movement about the center axis of the pivot shaft 14. It could alternatively be located behind the three point hitch framework 10. Elongated lever arm 17 is pivotally connected at one end to the rigid crank arm 16, this pivotal connection being shown at 22. The pivotal axis between crank arm 16 and lever arm 17 is parallel to and spaced from the center axis of pivot shaft 14. The radial distance separating these two pivot axes constitutes a constant torque arm between the operating mechanism and pivot shaft 14.

An intermediate rigid link 18 is pivotally connected at one end to the three point hitch framework 10 about an axis parallel to and spaced to one side of the center axis of pivot shaft 14. This pivotal connection is indicated in the drawings at 26. The remaining end of link 18 is pivotally connected to the intermediate portion of lever arm 17 at 23. Link 18 is thereby pivotally connected to both lever arm 17 and three point hitch framework 10 about axes that are parallel to both the center axis of pivot shaft 14 and the pivotal axis between the lever arm 17 and crank arm 16 at 22.

Power is applied to the assembly by means of an extensible hydraulic cylinder operably connected between the three point hitch framework 10 and the elongated lever arm 17. This connection imparts movement to the lever arm 17 for swinging the crank arm 16 about the center axis of pivot shaft 14 through an angular distance of at least 180°. As illustrated, the hydraulic cylinder 20 is pivotally connected to the three point hitch framework 10 at the same side of the center axis of pivot shaft 14 as is the intermediate rigid link 18. Its extension piston rod 21 is pivotally connected to the remaining end of lever arm 17, this connection being shown at 24. A pivotal connection between the base of the hydraulic cylinder 20 and the three point hitch framework 10 is indicated in the drawings at 25. These pivotal connections are also about axes that are parallel to the center axis of the pivot shaft 14.

Both the elongated lever arm 17 and the intermediate rigid link 18 have side edges facing toward the center axis of the pivot shaft 14 and arcuately curved in a concave configuration. These side edges are indicated in the drawings at 17a and 18a respectively. This curvature enables the arm 17 and link 18 to wrap closely about the pivot shaft 14 to accomplish full pivotal movement within a restricted physical configuration. The linkage geometry is best understood from the details shown in FIGS. 2 through 4.

In operation, the cylinder 20 is manually controlled to swing the plow frame 12 from one field position to the other (as shown in FIGS. 2 and 3) by moving the mechanical linkages between their extreme angular positions relative to the pivot shaft 14. As shown in the drawings, the plow frame 12 includes a brace 30 which comes to rest on pads 31 at alternate sides of the supporting three point hitch framework.

When the plow frame 12 is positioned in an upright or vertical orientation for travel purposes (FIG. 4) it can be held by the hydraulic cylinder 20 alone. However, to insure against hydraulic failure, there is preferably provided a pair of overlapping plates 27 mounted on the three point hitch framework 10 and movable so as to selectively overlap the sides of brace 30 to provide a mechanical interlock in addition to the hydraulic system. The plates 27 are normally clear of the plow frame 12 when not in use.

This arrangement provides a relatively simple interconnection between the supporting mobile tool carrier or three point hitch framework and the pivoted plow frame. It assures the application of a constant force from the hydraulic cylinder assembly to the plow frame through the full angular range of movement imparted to it. This is assured by the provision of a constant torque arm to the pivot shaft 14 through the pivotal connection from lever arm 17 to crank arm 16. The pivotal axis shown at the connection 22 remains at a constant radial distance outward from the center axis of shaft 14 and does not vary as the mechanism is operated. The apparatus thereby provides the constant torque available through a direct rotational drive, while permitting use of less expensive straight line hydraulic mechanism for basic application of power to the plow frame.

Having described our invention, we claim:

1. A rollover apparatus for a two-way plow having a supporting mobile framework and a plow frame pivotally mounted to the mobile framework about the center axis of a pivot shaft, comprising:

a rigid crank arm operatively fixed to the plow frame and extending radially outward from the center axis of the pivot shaft for joint coaxial movement with the pivot shaft;

an elongated rigid lever arm pivotally connected at one end to the crank arm about a first axis parallel to and spaced from the center axis of the pivot shaft, said lever arm having an arcuate side edge facing toward said pivot shaft and enabling the lever arm to wrap about the pivot shaft as the shaft is turned about its center axis through an angular distance of at least 180° degrees;

said elongated lever arm extending angular outward from the crank arm to one side of said center axis;

an intermediate rigid link having a first end pivotally connected to said framework about a second axis parallel to and spaced to one side of the center axis of the pivot shaft, the remaining end of said link being pivotally connected to said lever arm about a third axis parallel to said center axis of the pivot shaft;

a hydraulic cylinder having an extensible piston rod movably mounted therein;

said hydraulic cylinder being pivotally mounted to said framework about a fourth axis parallel to said center axis of the pivot shaft;

the outer end of said piston rod being pivotally mounted to said lever arm about a fifth axis spaced outwardly along the length of said lever arm from said third axis and parallel thereto, whereby pivotal forces are transmitted from the framework to the crank arm directly through the pivotal connections between the piston rod of the hydraulic cylinder and the lever arm.

* * * * *